United States Patent Office 2,746,952
Patented May 22, 1956

2,746,952

2,4-BIS(METHYLSULFONYL)-BENZENEAZO-
TETRAHYDRO-QUINOLINE COMPOUNDS

Joseph B. Dickey and George J. Taylor, Kingsport, Tenn., assignors to Eastman Kodak Company, Rochester, N. Y., a corporation of New Jersey No Drawing. Application June 30, 1951,
Serial No. 234,681

1 Claim. (Cl. 260—155)

This invention relates to new azo compounds and their application to the art of dyeing or coloring.

We have discovered that the new azo compounds having the general formula:

I

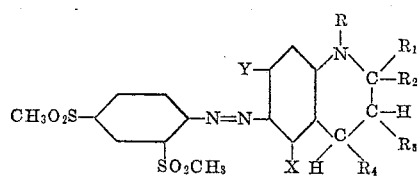

wherein R represents a hydroxyalkyl group having 2 to 4, inclusive, carbon atoms, a β-hydroxy-β-ethoxyethyl group or a β-hydroxy-γ-difluoropropyl group, $R_1$, $R_2$ and $R_4$ each represents a hydrogen atom or a methyl group, $R_3$ represents a hydrogen atom or a hydroxy group and X and Y each represents a hydrogen atom, a chlorine atom, a bromine atom, a fluorine atom or a methyl group, are valuable dyes for coloring textile materials made of or containing a cellulose alkyl carboxylic acid ester having 2 to 4 carbon atoms in the acid groups thereof. These dye compounds when applied to the aforesaid materials give rubine, bluish-violet and violet dyeings which have good light fastness, good wash fastness, excellent gas fastness and good dischargeability. The dye compounds have good dyeing properties for said textile materials. They are particularly of use for the coloration of cellulose acetate textile materials.

It is an object of our invention to provide new azo dye compounds. Another object is to provide a satisfactory process for the preparation of the new azo dye compounds of the invention. A further object is to provide dyed cellulose alkyl carboxylic acid ester textile materials which have good fastness to light, gas and washing. A particular object is to provide new azo compounds which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new azo dye compounds of our invention are prepared by diazotizing 2,4-bis(methylsulfonyl)-aniline having the formula:

I

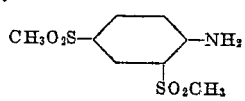

and coupling the diazonium compound obtained with a tetrahydroquinoline compound having the formula:

III

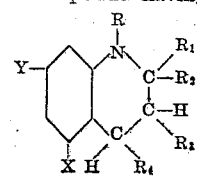

R, $R_1$, $R_2$, $R_3$, $R_4$, X and Y in the foregoing formulas have the meaning previously assigned to them. The β-hydroxyethyl, the β-hydroxypropyl, the γ-hydroxypropyl, the β,γ-dihydroxypropyl and the δ-hydroxybutyl groups are typical of the hydroxyalkyl groups represented by the member R.

Typical of the coupling compounds having the Formula III that are used in the preparation of the azo compounds of our invention are: N-β,γ-dihydroxypropyltetrahydroquinoline, N - β - hydroxyethyltetrahydroquinoline, N-β-methyl - β,γ - dihydroxypropyltetrahydroquinoline, N - γ-hydroxypropyltetrahydroquinoline, N - β - hydroxypropyltetrahydroquinoline, N - β-hydroxy-γ-difluoropropyltetrahydroquinoline, N - β - hydroxy-β-ethoxyethyltetrahydroquinoline, N-β-hydroxyethyl-2-methyltetrahydroquinoline, N-β,γ-dihydroxypropyl-2-methyltetrahydroquinoline, N-β-methyl-β,γ-dihydroxypropyl-2-methyltetrahydroquinoline, N-γ-hydroxypropyl-2-methyltetrahydroquinoline, N-β-hydroxypropyl - 2 - methyltetrahydroquinoline and N-β-hydroxy - γ - difluoropropyl - 2 - methyltetrahydroquinoline (all the foregoing tetrahydroquinoline compounds color cellulose acetate textile materials rubine shades when coupled with diazotized 2,4-bis(methylsulfonyl)-aniline), N-β,γ-dihydroxypropyl-2-methyl-7-chlorotetrahydroquinoline, N-β,γ-dihydroxypropyl-7-chlorotetrahydroquinoline, N - β-hydroxyethyl-2,2,4-trimethyltetrahydroquinoline, N-β,γ-dihydroxypropyl-2,5-dimethyltetrahydroquinoline, N-β,γ-dihydroxypropyl-2,7-dimethyltetrahydroquinoline, N-β-hydroxyethyl-2,2,4,7-tetramethyltetrahydroquinoline, N-β,γ - dihydroxypropyl-2,2,4,5-tetramethyltetrahydroquinoline, N-β-hydroxyethyl-3-hydroxytetrahydroquinoline, N-β,γ-dihydroxypropyl-5-methyltetrahydroquinoline, N-β,γ-dihydroxypropyl - 7 - methyltetrahydroquinoline, N-β-hydroxyethyl-5-chlorotetrahydroquinoline, N-β,γ-dihydroxypropyl-7-chlorotetrahydroquinoline, N-β-hydroxyethyl-5-fluorotetrahydroquinoline, N-β-hydroxyethyl-7-fluorotetrahydroquinoline, N - β,γ-dihydroxypropyl-5-bromotetrahydroquinoline and N-β-hydroxyethyl-7-bromotetrahydroquinoline.

The following examples illustrate the azo compounds of our invention and their manner of preparation.

EXAMPLE 1

A. Nitrosyl sulfuric acid 7.6 parts of dry sodium nitrite were added with stirring to 92 parts of sulfuric acid (sp. gr. 1.84) while keeping the temperature below 70° C. The resulting solution was then cooled to 5° C.–10° C. and 100 parts of acetic acid were added dropwise, with stirring, while maintaining the temperature at 5° C.–10° C.

B. Diazotization 24.9 parts of 2,4-bis(methylsulfonyl)-aniline were added slowly, with stirring, to the nitrosyl sulfuric acid prepared as described above, while keeping the temperature below 20° C. Then, 100 parts of acetic acid were added dropwise, with stirring, at a temperature between 15° C.–20° C., and stirring was continued until all the 2,4-bis(methylsulfonyl)-aniline had dissolved and diazotization was complete. The diazonium solution thus formed was then poured onto 500 parts of crushed ice, and enough urea was added to destroy the excess nitrous acid. The diazonium solution should be clear and free of suspended undiazotized amine.

C. Coupling

The diazonium solution prepared as described in B was then added slowly, with stirring, to 17.7 parts of N-β-hydroxyethyltetrahydroquinoline dissolved in 200 parts of ice and water containing 17.5 parts of aqueous hydrochloric acid (sp. gr. 1.16). The coupling reaction which takes place is completed by adding portionwise just sufficient sodium carbonate to neutralize the acid present in the reaction mixture. The dye compound formed is recovered by filtration, washed with water and dried. It has the formula:

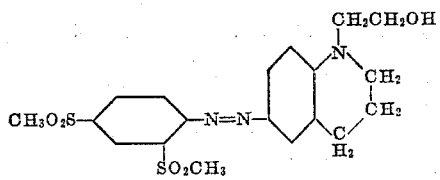

and colors cellulose acetate textile materials rubine shades.

EXAMPLE 2

24.9 parts of 2,4-bis(methylsulfonyl)-aniline were diazotized and the diazonium compound obtained was coupled with 20.5 parts of N-β-hydroxyethyl-2,7-dimethyltetrahydroquinoline. Diazotization, coupling and recovery of the dye compound formed were carried out in accordance with the procedure described in Example 1. The dye compound obtained colors cellulose acetate textile materials rubine shades.

EXAMPLE 3

24.9 parts of 2,4-bis(methylsulfonyl)-aniline were diazotized and the diazonium compound obtained was coupled with 25.5 parts of N-β,γ-dihydroxypropyl-2-methyl-7-chlorotetrahydroquinoline. Diazotization, coupling and recovery of the dye compound formed were carried out in accordance with the procedure described in Example 1. The dye compound obtained colors cellulose acetate textile materials rubine shades.

EXAMPLE 4

24.9 parts of 2,4-bis(methylsulfonyl)-aniline were diazotized and the diazonium compound obtained was coupled with 22.1 parts of N-β,γ-dihydroxypropyl-2-methyltetrahydroquinoline. Diazotization, coupling and recovery of the dye compound formed were carried out in accordance with the procedure described in Example 1. The dye compound obtained colors cellulose acetate textile materials rubine shades.

EXAMPLE 5

24.9 parts of 2,4-bis(methylsulfonyl)-aniline were diazotized and the diazonium compound obtained was coupled with 23.5 parts of N-β-methyl-β,γ-dihydroxypropyl-2-methyltetrahydroquinoline. Diazotization, coupling and recovery of the dye compound formed were carried out in accordance with the procedure described in Example 1. The dye compound obtained colors cellulose acetate textile materials rubine shades.

EXAMPLE 6

24.9 parts of 2,4-bis(methylsulfonyl)-aniline were diazotized and the diazonium compound obtained was coupled with 20.5 parts of N-β-hydroxyethyl-2,5-dimethyltetrahydroquinoline. Diazotization, coupling and recovery of the dye compound formed were carried out in accordance with the procedure described in Example 1. The dye compound obtained colors cellulose acetate textile materials violet shades.

EXAMPLE 7

24.9 parts of 2,4-bis(methylsulfonyl)-aniline were diazotized and the diazonium compound obtained was coupled with 22.3 parts of N-β,γ-dihydroxypropyl-3-hydroxytetrahydroquinoline. Diazotization, coupling and recovery of the dye compound formed were carried out in accordance with the procedure described in Example 1. The dye compound obtained colors cellulose acetate textile materials rubine shades.

EXAMPLE 8

24.9 parts of 2,4-bis(methylsulfonyl)-aniline were diazotized and the diazonium compound obtained was coupled with 23.5 parts of N-β,γ-dihydroxypropyl-2,7-dimethyltetrahydroquinoline. Diazotization, coupling and recovery of the dye compound formed were carried out in accordance with the procedure described in Example 1. The dye compound obtained colors cellulose acetate textile materials violet shades.

EXAMPLE 9

24.9 parts of 2,4-bis(methylsulfonyl)-aniline were diazotized and the diazonium compound obtained was coupled with 24.1 parts of N-β,γ-dihydroxypropyl-7-chlorotetrahydroquinoline. Diazotization, coupling and recovery of the dye compound formed were carried out in accordance with the procedure described in Example 1. The dye compound obtained colors cellulose acetate textile materials rubine shades.

EXAMPLE 10

24.9 parts of 2,4-bis(methylsulfonyl)-aniline were diazotized and the diazonium compound obtained was coupled with 20.9 parts of N-δ-hydroxybutyl-2-methyltetrahydroquinoline. Diazotization, coupling and recovery of the dye compound formed were carried out in accordance with the procedure described in Example 1. The dye compound obtained colors cellulose acetate textile materials rubine shades.

EXAMPLE 11

24.9 parts of 2,4-bis(methylsulfonyl)-aniline were diazotized and the diazonium compound obtained was coupled with 24.1 parts of N-β-hydroxy-γ-difluoropropyl-2-methyltetrahydroquinoline. Diazotization, coupling and recovery of the dye compound formed were carried out in accordance with the procedure described in Example 1. The dye compound obtained colors cellulose acetate textile materials rubine shades.

N-β-hydroxy-γ-difluoropropyltetrahydroquinoline compounds are prepared by reacting 3,3-difluoro-1,2-propylene oxide

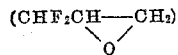

with a tetrahydroquinoline compound unsubstituted in its nuclear nitrogen atom (i. e. the hydrogen atom attached to the nuclear nitrogen atom is not replaced by any other substituent).

PREPARATION OF N-β-HYDROXY-γ-DIFLUOROPROPYL-TETRAHYDROQUINOLINE 13.3 grams of tetrahydroquinoline and 10 grams of 3,3-difluoro-1,2-propylene oxide were reacted together in a shaking autoclave at 180° C. for about 8 hours. When cool, the reaction mixture was removed and fractionally distilled under reduced pressure to obtain N-β-hydroxy-γ-difluoropropyltetrahydroquinoline.

By the use of an equivalent amount of 2-methyltetrahydroquinoline, 2,7-dimethyltetrahydroquinoline and 5-chlorotetrahydroquinoline, for example, in the above example, N-β-hydroxy-γ-difluoropropyl-2-methyltetrahydroquinoline, N-β-hydroxy-γ-difluoropropyl-2,7-dimethyltetrahydroquinoline and N-β-hydroxy-γ-difluoropropyl-5-chlorotetrahydroquinoline, respectively, are obtained.

PREPARATION OF 3,3-DIFLUORO-1,2-PROPYLENE OXIDE

To 13 grams of 3,3-difluoro-2-chloro-1-hydroxypropane were added portionwise, with stirring, 20 grams of a 20% aqueous sodium hydroxide solution. Stirring was continued at 20–25° C. for 15 to 30 minutes following which the nonaqueous layer which separated was distilled off. The product was purified by drying and fractionally distilling it under slightly reduced pressure. A good yield of 3,3-difluoro-1,2-propylene oxide was thus obtained. An equivalent amount of 3,3-difluoro-2-bromo-1-hydroxypropane can be used in place of 3,3-difluoro-2-chloro-1-hydroxypropane in the above example.

PREPARATION OF 3,3-DIFLUORO-2-CHLORO-1-HYDROXYPROPANE 49 grams of 3,3-difluoropropene were introduced as a gas through a bubbler tube during 2–3 hours into a stirred aqueous solution of HOCl (0.2 gram mole) maintained at 0° C. The reaction mixture was allowed to stand overnight at −2° C. and then was stirred at −5° C. for 3 hours after which it was allowed to come up to room tempearture during a period of 2 hours. The reaction mixture was saturated with sodium chloride and the reaction product which separated as a layer was removed by extraction with five 200 cc. portions of ethyl ether. The ethyl ether extract was dried over sodium sulfate and filtered. The ether was distilled off the ether extract and the residue remaining was fractionated through a packed column under reduced pressure. After obtaining a forerun of 6 grams, 43.5 grams of 3,3-difluoro-2-chloro-1-hydroxypropane, B. P. 64° C.–66° C./36 mm. were obtained. It has a boiling point of 138° C.–142° C. at atmospheric pressure. $N_D^{20}$ 1.4113.

It is a colorless liquid, somewhat soluble in water and soluble in the usual organic solvents.

By the use of 0.2 gram mole of an aqueous hypobromous acid solution in place of the aqueous HOCl solution used in the above example, a good yield of 3,3-difluoro-2-bromo-1-hydroxypropane is obtained. It is a colorless liquid, somewhat soluble in water and soluble in the usual organic solvents.

3,3-difluoro-2-chloro-1-hydroxypropane, 3,3-difluoro-2-bromo-1-hydroxypropane and 3,3-difluoro-1,2-propylene oxide are described and claimed in Dickey and Towne U. S. application Serial No. 211,177, filed February 15, 1951, now Patent No. 2,700,686.

The new azo compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

The azo compound having the formula:

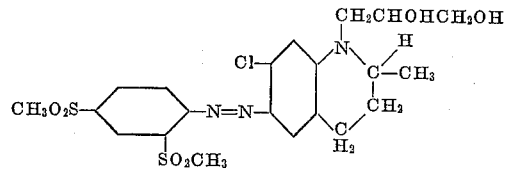

References Cited in the file of this patent

UNITED STATES PATENTS

| | | |
|---|---|---|
| 2,147,338 | Felix et al. | Feb. 14, 1939 |
| 2,323,315 | Dickey et al. | July 6, 1943 |
| 2,386,599 | Dickey et al. | Oct. 9, 1945 |
| 2,387,987 | Felix et al. | Oct. 30, 1945 |
| 2,551,056 | Schetty | May 1, 1951 |